(12) United States Patent
Lesage et al.

(10) Patent No.: US 11,311,851 B2
(45) Date of Patent: *Apr. 26, 2022

(54) FEEDSTOCK INJECTION DEVICE OF AN FCC UNIT

(71) Applicant: TOTAL RAFFINAGE CHIMIE, Courbevoie (FR)

(72) Inventors: Romain Lesage, Antwerp (BE); Sébastien Decker, Octeville sur Mer (FR); Jean-Christophe Raboin, Chaumont sur Tharonne (FR); Youen Kerneur, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/967,069

(22) PCT Filed: Feb. 4, 2019

(86) PCT No.: PCT/EP2019/052595
§ 371 (c)(1),
(2) Date: Aug. 3, 2020

(87) PCT Pub. No.: WO2019/154748
PCT Pub. Date: Aug. 15, 2019

(65) Prior Publication Data
US 2021/0031159 A1    Feb. 4, 2021

(30) Foreign Application Priority Data
Feb. 8, 2018    (FR) ...................................... 1851068

(51) Int. Cl.
*B01J 8/18* (2006.01)
*B01J 4/00* (2006.01)
*C10G 11/18* (2006.01)

(52) U.S. Cl.
CPC ............. *B01J 4/002* (2013.01); *B01J 8/1827* (2013.01); *C10G 11/18* (2013.01); *B01J 2208/00902* (2013.01)

(58) Field of Classification Search
CPC ...................... B01J 4/002; B01J 8/1827; B01J 2208/00902; B01J 8/24; C10G 11/18
(Continued)

(56) References Cited

U.S. PATENT DOCUMENTS

| 6,596,242 B1 * | 7/2003 | Dries ....................... B01J 8/008 422/139 |
| 10,807,057 B2 * | 10/2020 | Lesage ..................... B01J 19/26 |

(Continued)

FOREIGN PATENT DOCUMENTS

| WO | 2015073133 A1 | 5/2015 |
| WO | 2015170034 A1 | 11/2015 |
| WO | 2018172473 A1 | 9/2018 |

OTHER PUBLICATIONS

International Search Report issued in Application No. PCT/EP2019/052595, dated Apr. 16, 2019; 5 pages.

*Primary Examiner* — Huy Tram Nguyen
(74) *Attorney, Agent, or Firm* — Albert Shung

(57) ABSTRACT

The invention relates to an injection device (10) for atomizing a liquid into droplets using a gas, comprising a hollow tubular body (12) having a longitudinal direction (X). An inner wall (13) defines a first region, referred to as contact region (Z1), and a second region (Z2). The body includes: —at least two inlet ports (14; 16) for injecting liquid and an inlet port for injecting gas, all of said ports extending to the first region (Z1); —at least one outlet port (18), located downstream of the first and second regions, for discharging the atomized liquid. The body (12) has an inner cross-section that varies continuously or constantly over the entire length thereof. Between regions (Z1) and (Z2), the (Continued)

inner wall (13) includes at least one baffle (261) which is shaped such that in each plane running perpendicularly to the longitudinal direction of the body containing said baffle, the baffle reduces an inner cross-section of the body over the entire periphery of the inner wall (13).

10 Claims, 3 Drawing Sheets

(58) Field of Classification Search
USPC .......................................................... 422/310
See application file for complete search history.

(56) References Cited

U.S. PATENT DOCUMENTS 10,835,883 B2 * 11/2020 Lesage ................... C10G 11/18
2016/0288075 A1 * 10/2016 Lacroix ................. B05B 7/0012

* cited by examiner

A-A

A-A

B-B

FEEDSTOCK INJECTION DEVICE OF AN FCC UNIT

CROSS-REFERENCE TO RELATED APPLICATIONS

This application claims the benefit of PCT/EP2019/052595 filed Feb. 4, 2019, which claims priority from FR 1851068 filed Feb. 8, 2018, which are incorporated herein by reference in their entireties for all purposes.

The present invention relates to an injection device, notably to a hydrocarbon charge injection device for a refining unit, particularly a fluid catalytic cracking (FCC) unit.

The liquid hydrocarbon charges processed in refining units are generally brought into contact with a solid catalyst which will encourage the chemical reaction or reactions used to process the charge. In order to improve this contact and maximize the efficiency of the reactions, these liquid hydrocarbon charges are atomized into fine droplets by injection devices. This atomization makes it possible to maximize the area for contact between liquid (liquid hydrocarbon charge) and solid (catalyst), encouraging the transfer of heat and therefore encouraging the vaporization of these hydrocarbons which then react in a gaseous phase on contact with the solid (catalyst). Although there is no real consensus regarding the optimum diameter for the droplets, the desire is generally to form droplets the diameter of which is of the same order of magnitude as the diameter of the particles of catalyst, namely under 200 microns, for example of the order of 50 to 80 microns.

In general, use is made of injection devices referred to as "diphasic", which have a roughly cylindrical hollow body and two inlet openings via which the liquid hydrocarbon charge and an atomizing gas, generally steam, are respectively injected into the body. A contact chamber is formed inside the body, in which chamber the hydrocarbon charge and the atomizing gas are brought into contact in order to atomize the hydrocarbon charge. Once atomized, the hydrocarbon charge is ejected via an outlet opening that opens into the reactor. Each injection device is installed on a wall of the reactor so that one end of the injection device comprising the outlet opening is situated inside the reactor.

Impact-type injection devices are known, in which the charge is introduced into the body radially and impinges on a target situated at the centre of the body, causing droplets to form. An atomizing gas circulating axially allows these droplets to be entrained, while being divided further, towards the outlet from the body. A phenomenon of target erosion may nevertheless be observed, notably when the charge that is to be injected contains particles, and this makes it necessary to reinforce the target, increasing the cost further.

In certain injection devices, additional atomizing gas may be injected into the body via a pipe surrounding the target: the atomizing gas then leaves at target level and impinges on the liquid introduced via the opening situated facing the target, encouraging atomization of the jet of liquid that it strikes head-on. The mixing chamber of these injection devices with dual injection of atomizing gas is, nevertheless, complex and expensive to produce. It therefore has to be produced separately, and then secured to the hollow body of the injection device.

The Applicant Company has also proposed, in document WO2015/170034A1, injection devices that allow several jets of liquid to be injected into the body using two or more radial pipes. These devices do not use an internal target sensitive to erosion but the mixing chamber remains complex and expensive to produce.

The invention seeks to at least partially alleviate the disadvantages mentioned hereinabove. To this end it proposes an injection device configured to atomize a liquid into droplets using a gas, comprising a hollow tubular body extending in a longitudinal direction and of which an internal wall, notably a cylindrical wall, defines a first zone referred to as a contact zone and a second zone situated downstream of the first zone with respect to a direction in which the liquid and the gas circulate inside the body, the latter having:

- at least two inlet openings opening into the said first zone, to inject a liquid, the said openings each having an axis oriented in such a way that the streams of liquid emanating from the said openings converge on a longitudinal line X extending inside the body,
- one inlet opening opening into the said first zone, so as to inject an atomizing gas into the first zone,
- at least one outlet orifice situated downstream of the first and second zones, for removing the atomized liquid from the body. According to the invention, the body has an internal cross section that varies continuously or constantly along its entire length and the internal wall of the body is provided, between the first and the second zones, with at least one chicane configured so that, in each plane perpendicular to the longitudinal direction of the body containing the said chicane, this chicane reduces an internal cross section of the body over the entire periphery of the internal wall.

In the usual way, a chicane is a device which impedes the passage of a moving fluid.

The particular arrangement of the invention makes it possible to produce the body in a way that is very simple without detracting from the quality of atomization of the injection device.

The body has an internal cross section that varies continuously, or in other words without any sudden variation and without any shoulder. The body may thus have a frustoconical, cylindrical, or similar shape. For preference, the body has a constant internal cross section. It may for example be a cylinder or the like.

The body may advantageously be made as a single piece. Furthermore, the chicane or chicanes may be produced in a simple way. A chicane may, for example, take the form of a simple collar or ring inserted inside the body and fixed thereto.

The device that forms the subject of the present invention is notably a device that has no internal target. In particular, each inlet opening has no internal target.

In one embodiment, the internal wall is provided with a single chicane extending notably over a length at least equal to the longest dimension of a cross section of the body.

This chicane may, for example, take the form of a ring inserted inside the body, the internal wall of which it hugs.

Advantageously, the chicane may have a profile (in longitudinal section) that is irregular, notably wavy or toothed, in the longitudinal direction of the body. This arrangement may make it possible to improve the dispersion of the stream downstream of the chicane.

In another embodiment, the said internal wall may be provided with a plurality of disjointed chicanes. This makes it easier for the fluids to mix without in so doing increasing the pressure drop, something which may prove particularly advantageous for heavy charges.

The features hereinafter, alone or in combination, also make it possible to improve the mixing between the liquid and the gas without appreciably increasing the pressure drop.

Thus, when there are several chicanes present, each chicane may advantageously be spaced away from at least one other chicane in the longitudinal direction of the body.

In that case, the chicanes may then extend over a relatively short length of the body.

Several adjacent chicanes may have heights, measured perpendicular to the longitudinal direction of the body, which are non-zero and different. This may also make it possible to improve the dispersion of the fluid.

In particular, in the longitudinal direction of the body, the heights of adjacent chicanes may increase up to a maximum and to decrease.

Independently of the number of chicanes and layout thereof, the chicane or chicanes may have different shapes, which may potentially be combined.

The said at least one chicane may thus define a wall projecting from the internal wall and one edge of which is secured to the internal wall. In particular, this edge may be secured to the internal wall along a line which may extend in a plane perpendicular to the longitudinal direction of the said body or may undulate from one side of this plane to the other.

The wall defined by the said at least one chicane may further exhibit a free edge distant from the toothed or crenellated internal wall.

The said at least one chicane may exhibit orifices passing right through it.

The wall defined by each chicane may be a planar wall which is simple to produce, a wavy wall, or else may be a curved wall.

The said at least one chicane may, on the side of the inlet openings, exhibit a curved face arranged so as to direct a fluid impinging on this face towards the inside of the body, which may make it possible to improve the mixing.

Whatever its shape (curved or planar), a chicane (or the tangent thereto at the point at which it meets the internal wall of the body) may define a predetermined angle with respect to a plane orthogonal to the longitudinal direction of the body. This angle may be variable for one and the same chicane.

Whatever the shape (curved or planar) of a chicane, its free edge (the edge opposite to its edge secured to the internal wall of the body) may have one or two faces of rounded or bevelled shape.

In general, the chicane or chicanes may have a height, measured perpendicular to the longitudinal direction of the body, that is non-zero. Advantageously, this height is equal at most to ½ of the maximum internal dimension of the body perpendicular to the longitudinal direction of the body. For preference, this height is equal to at most ¼ of the maximum internal dimension of the body, or even $1/8^{th}$ of this maximum dimension, for example of the order of $1/10^{th}$ of this maximum dimension. This height may furthermore be variable for one and the same chicane.

In general, except in the case of a single chicane extending over a length, in the longitudinal direction, at least equal to a maximum internal dimension of the body measured perpendicular to the longitudinal direction, the chicane or chicanes may exhibit a thickness (or length), measured in the longitudinal direction of the body, that is non-zero. Advantageously, this thickness is at most 35 mm, preferably at most 31 mm, or even at most 20 mm or at most 16 mm. The thickness may lie in a range of values defined by any combination of the aforementioned limits. This thickness may for example be of the order of 10 mm.

The invention is now described with reference to the appended, non-limiting drawings, in which.

Figure 3:
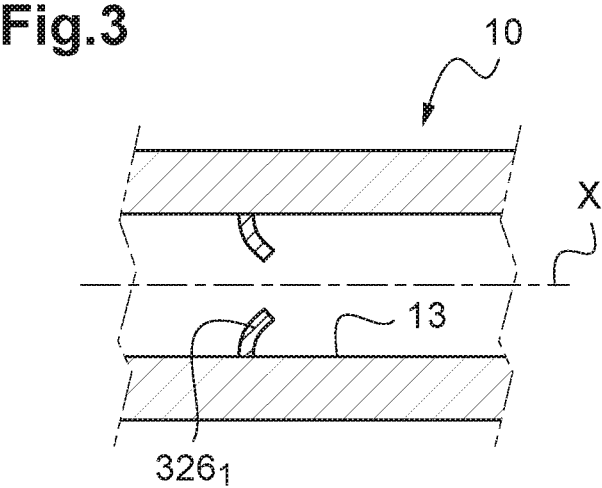
Figure 4:
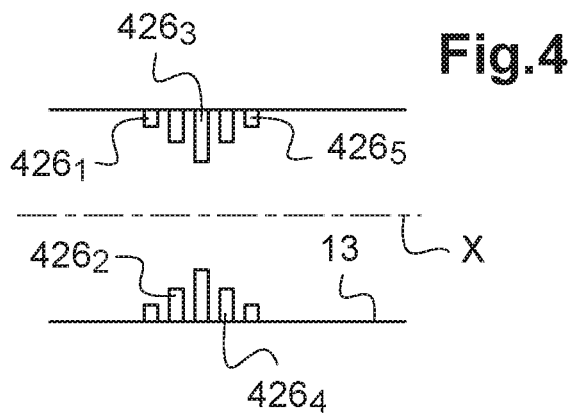
Figure 5:
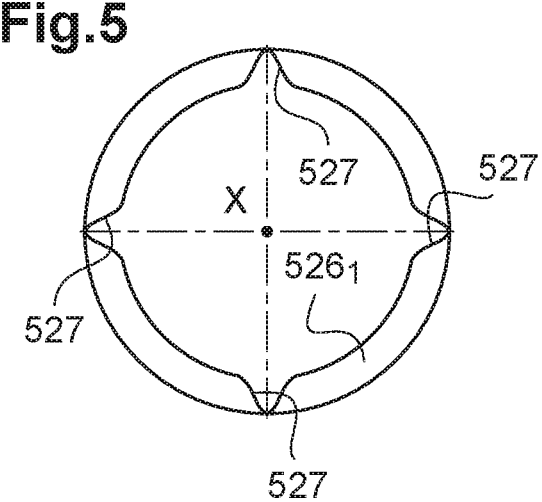
Figure 6:
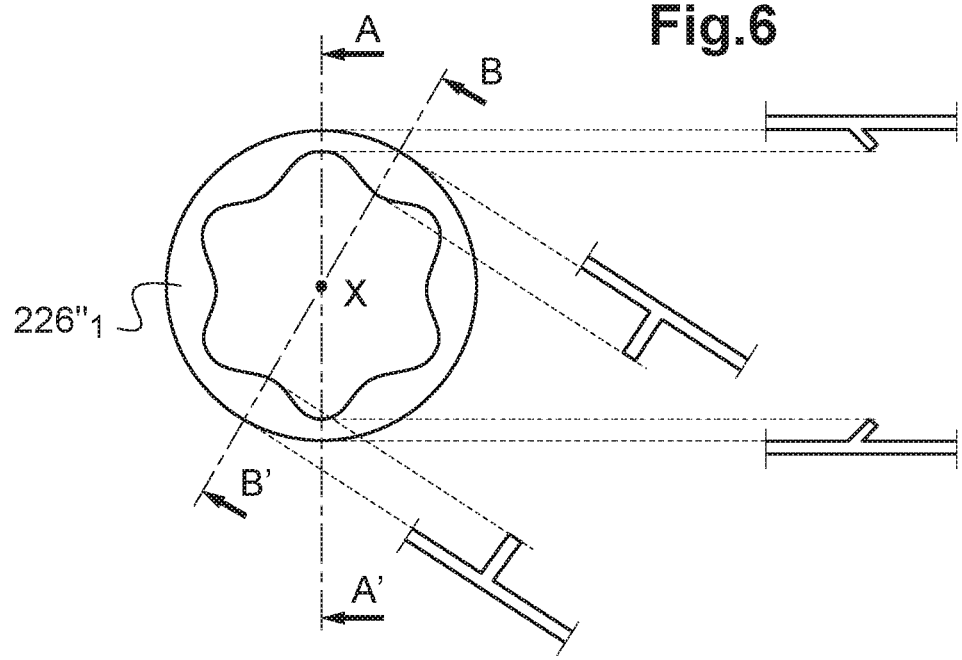
Figure 7:
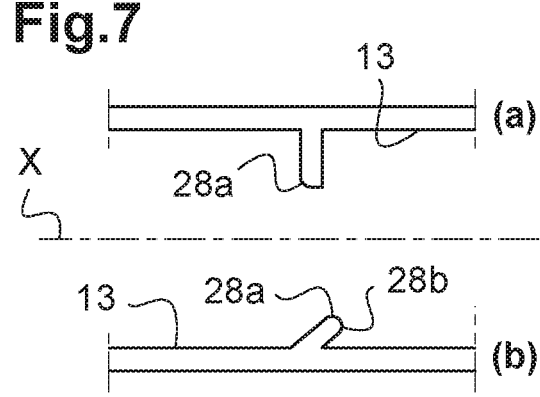
Figure 8:
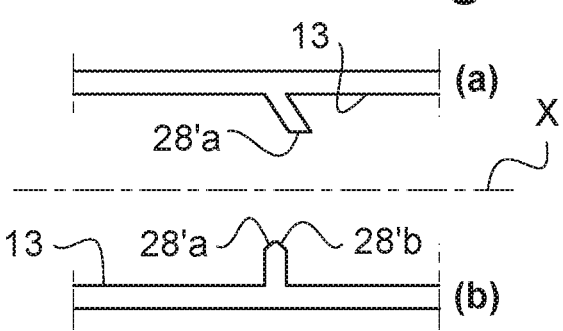
Figure 9:
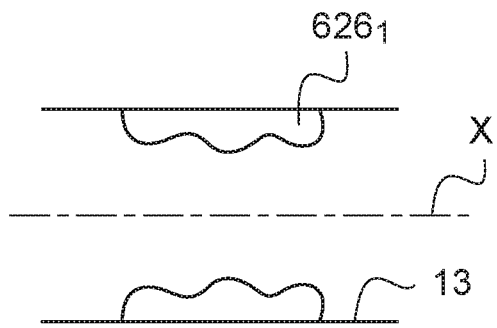

FIG. 3 partially depicts a longitudinal section of an injection device according to another alternative form;

FIG. 4 partially depicts a longitudinal section of an injection device according to another alternative form;

FIG. 5 depicts a face-on view (along the longitudinal axis X) of several chicanes according to another alternative form;

FIG. 6 depicts a face-on view (along the longitudinal axis X) of one and the same chicane according to another alternative form, and views in section in two distinct directions A'A and B'B which are perpendicular to the longitudinal direction;

FIGS. 7 and 8 partially depict views in longitudinal section of chicanes having free edges of different shapes, FIG. 9 partially depicts a longitudinal section of an injection device according to yet another alternative form.

In the various figures, elements that are identical bear the same references.

Figure 1:
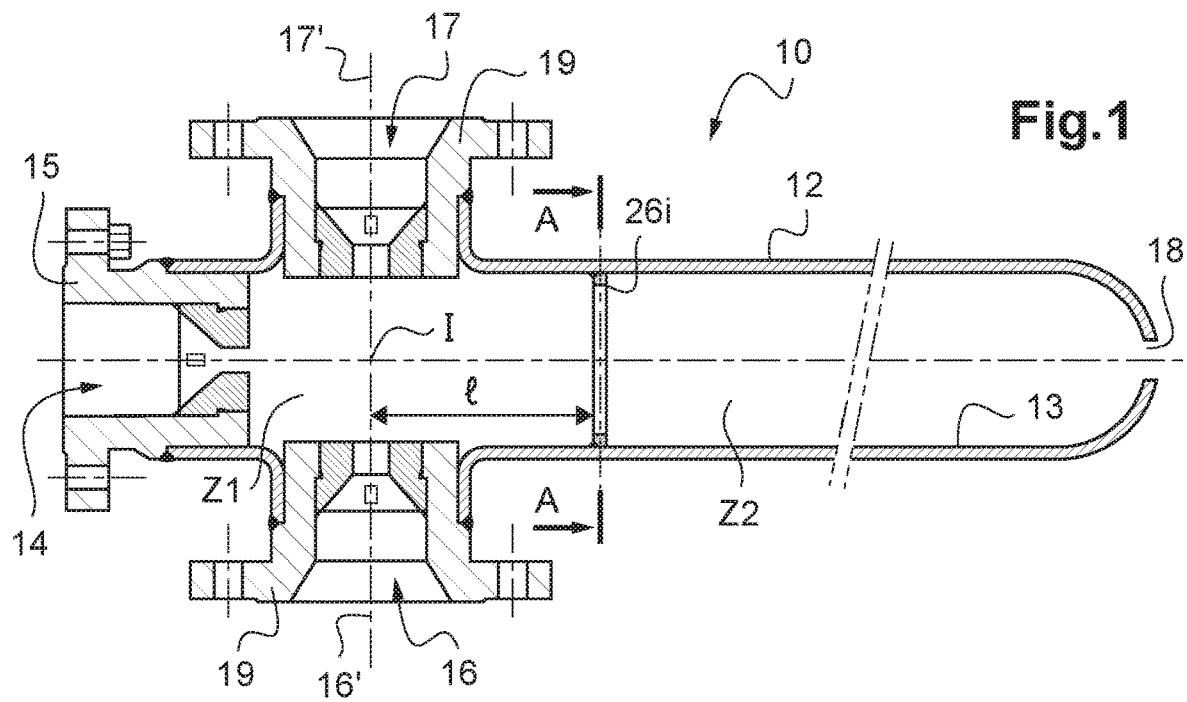
FIG. 1 is a schematic depiction in longitudinal section of an injection device according to one embodiment of the invention.

FIG. 1 schematically depicts an injection device 10 which has a hollow tubular body 12 which extends in a longitudinal direction X.

The body 12 comprises an internal wall 13 which defines a first zone Z1 referred to as contact zone, and a second zone Z2 situated downstream of the first zone Z1 with respect to a direction in which the liquid and the gas circulate inside the body (in this instance from left to right in FIG. 1).

The injection device 10 further comprises:
  an inlet opening 14 opening into the first zone Z1, so as to inject an atomizing gas into the first zone,
  a second inlet opening 16 opening into the said first zone Z1, so as to inject a liquid into the first zone,
  a third inlet opening 17 opening into the first zone Z1, likewise so as to inject a liquid into the first zone,
  at least one outlet orifice 18 situated downstream of the first and second zones, for removing the atomized liquid from the body, The first opening 14 is thus intended to be connected to a gas supply pipe, while the openings 16 and 17 are intended to be connected to a liquid supply pipe. As described in document WO2015/170034A1 (incorporated by reference), a single liquid supply pipe may be provided, which supplies a chamber communicating with the openings 16 and 17, or one supply pipe per opening may be provided.

The second and third openings 16, 17 each have an axis 16', 17'.

These axes 16', 17' are oriented in such a way that the streams of liquid emanating from the openings 16, 17 converge on a longitudinal line extending inside the body, here the longitudinal axis X. In this example, the axes 16', 17' extend perpendicular to the longitudinal direction of the body and are arranged in such a way that their axes 16', 17' intersect at one single same point I on the longitudinal axis X. The invention is not restricted to this embodiment provided that the streams or jets of liquid emanating from the openings converge towards one another and impinge on a longitudinal line internal to the body.

Inside the body 12, the fluids circulate from the inlet openings 14-17 towards the outlet orifice 18.

Here, the first zone Z1 and the second zone Z2 take the form of a straight internal pipe connecting the first inlet opening 14 to the outlet orifice 18 in an axial direction of the said body. This internal pipe in this example has a constant internal diameter. The invention is not, however, limited by this embodiment. The internal cross section of this pipe (in other words of the body) could vary continuously or be constant over the entire length of the pipe (i.e. of the body), without, however, being circular.

In the embodiment depicted, the body 12 is a cylinder, in other words the internal wall 13 here is cylindrical, its axis coinciding with the longitudinal direction X of the body. It will be noted that the body 12 is produced in a single piece. Nevertheless, it could be produced in two or more parts welded together. The opening 14, on the one hand, and the openings 16, 17 on the other, each accept a respective element 15, 19 for the introduction of the fluids. It will be noted that these elements do not project into the body. This arrangement may be provided for a body that is non-cylindrical.

The jets of liquid entering via the openings 16 and 17 are sprayed towards one another and strike one another substantially at the point I. The burst jets of liquid are carried away in the form of droplets by a stream of atomizing gas introduced at high speed via the opening 14. Atomization of the liquid takes place in two stages. A first part of the atomization occurs at the point I by impact of the jets with one another. The jets of liquid thus burst are sheared by the incoming gas by the gas introduced through the opening 14. The second part of the atomization occurs at the reduced-diameter outlet orifice 18, where the narrowing in diameter accelerates the fluids.

In the example depicted, the two openings 16, 17 face one another (their axes 16', 17' coincide). However, it is possible to conceive of a higher number of openings for the liquid, for example 3 or 4 or even more, arranged in such a way that the jets of liquid strike one another at the point I on the axis X in the stream of gas entering via the opening 14. In general, the liquid is thus injected radially into the body, which has no target.

According to the invention, the internal wall 13 of the body is also provided, between the first zone Z1 and the second zone Z2, with at least one chicane 26i (where i, the number of chicanes, is a non-zero whole number). Because this chicane locally reduces the diameter of the internal wall 13, it disrupts the movement of the fluid, encouraging mixing. In particular, the presence of a chicane makes it possible to avoid the formation of a film of liquid on the wall by bringing the liquid back into the axis of the stream of gas.

Figure 2A:
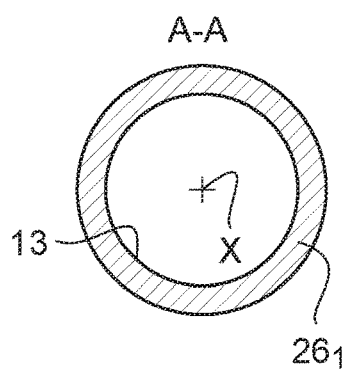
FIG. 2a is a view in section on AA of a chicane of FIG. 1, according to one embodiment.

One or more chicanes may be provided. The injection device 10 may thus comprise a single chicane $26_1$, as depicted in FIG. 2a, situated at the line of section A-A of FIG. 1. This chicane $26_1$ takes the form of a solid collar extending over the entire periphery of the internal wall 13. Here, the chicane $26_1$ defines a wall extending at right angles to the longitudinal direction X.

FIGS. 2 to 9 depict other embodiments which differ from those previously described in terms of the number and/or shape of the chicanes. In these figures, the chicanes are denoted by the reference "26i" or "J26i", the suffix "i", a non-zero whole number, representing the number of chicanes, embodiments differing from those previously described being identified by J (a whole number from 1 to 6 in the examples), the alternative forms of one and the same embodiment being identified by the prime (') and double prime (") symbols.

Figure 2B:
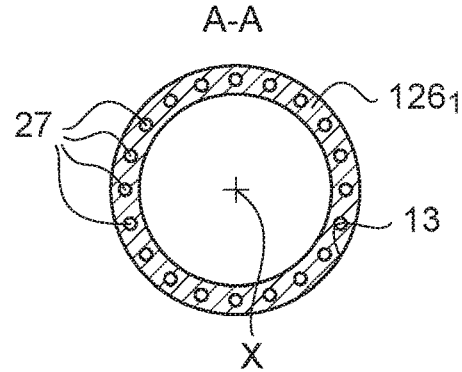
FIGS. 2b, 2c and 2d are views in section similar to those of FIG. 2a according to other embodiments.

FIG. 2b is a view in cross section of a chicane according to another embodiment, in which the chicane $126_1$ is perforated. Orifices 27 pass right through it, allowing the passage of fluid. This arrangement makes it possible to improve the dispersion of the fluid downstream of the chicane, causes less disruption to the flow of the fluid, while at the same time re-orientating this fluid towards the axis of the body 12.

Figure 2C:
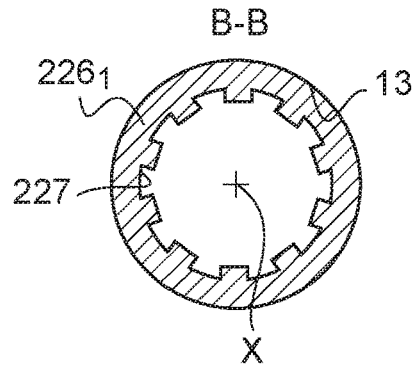
Figure 2D:
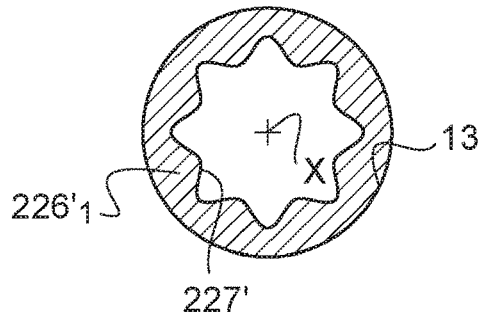

FIGS. 2c and 2d are views in cross section of a chicane according to another embodiment, in which the chicane $226_1$, $226'_1$ has a free edge 227, 227' respectively, distant from the internal wall 13 which is either toothed (in the case of the chicane $226_1$) or crenellated (in the case of the chicane $226'_1$). These arrangements have a similar effect to that of FIG. 2b.

In the example depicted in FIG. 1 and FIGS. 2a-2d, the chicanes take the form of planar walls perpendicular to the longitudinal direction X. In other words, one edge of the wall of each chicane is thus secured to the internal wall 13 along a line extending in a plane perpendicular to the longitudinal direction of the said body.

These walls could also be curved. Thus, FIG. 3 is a partial depiction in axial section of the injection device 10 provided with a chicane $326_1$ that is curved, notably in the direction of the central longitudinal axis of the body 12. Here, the concavity of the chicane is orientated towards the outlet orifice 18. Nevertheless, provision could be made for it to be orientated in the opposite direction. Provision could also be made for one and the same chicane to have parts that are curved in opposite directions.

One single chicane is depicted in the example of FIGS. 1, 2a-2d, 3, though other chicanes 26i, 126i, 226i, 226'i, 326i spaced apart in the direction X could nevertheless be provided.

The embodiment of FIG. 4 shows 5 chicanes $426_1$, $426_2$, $426_2$, $426_4$, $426_5$, spaced apart in the longitudinal direction X of the body 14. It will be noted that each chicane has a height that is constant over its entire periphery (as in the example of FIG. 2a), but that adjacent chicanes have different heights. In the example, the heights of the chicanes increase until they reach a maximum and to decrease.

Whatever the embodiment, the chicane or chicanes may have a radial dimension or height (perpendicular to the longitudinal direction X) that is relatively small, for example less than $\frac{1}{8}^{th}$ of the diameter of the internal wall 13, or even of the order of $\frac{1}{10}^{th}$ of this diameter, but not zero. This height may have a value in a range defined by any combination of the aforementioned limits.

This height may differ from one chicane to another, as in the embodiment of FIG. 4. This height may also vary along the periphery of a chicane, as in the examples of FIGS. 2c, 2d and 5. In FIG. 5, the chicane $526_1$ has 4 notches 527 where its height is reduced, but non-zero.

It will be noted that, whatever its shape (curved or planar), a chicane (or the tangent thereto at the point at which it meets the internal wall 13 of the body) may define a predetermined angle with respect to a plane orthogonal to the longitudinal direction of the body (see FIGS. 3, 6, 7(b) and 8(a)). This angle may be variable for one and the same chicane $226''_1$, as visible in FIG. 6.

The chicane or chicanes inclined in this way may be inclined in the direction of the outlet orifice 18.

Whatever its shape (curved or planar), the free edge of a chicane (the opposite edge to the edge secured to the internal wall of the body) may have a face 28*a* of rounded shape (FIG. 7(*a*)), a face 28'*a* that is bevelled (FIG. 7(*b*)), two faces 28*a*, 28*b* with a rounded shape (FIG. 8*a*)) or two faces 28'*a*, 28'*b* with a bevelled shape (FIG. 8(*b*)).

When just one face is provided, it is preferably situated on the side of the mixing zone Z1 in the longitudinal direction X.

The aforementioned non-zero thickness (or length) of the chicanes, measured in the longitudinal direction X of the body is, for example, at most 16 to 35 mm.

It will be noted that the chicane or chicanes described with reference to FIGS. 1, 2*a*-2*d*, and 3 to 8 define a (planar or non-planar) wall of which the dimension in the longitudinal direction X is less than the dimension in a direction perpendicular to the longitudinal direction. In the embodiment of FIG. 9, the chicane no longer defines a wall insofar as the length (in the longitudinal direction X) is greater than its dimension perpendicular to the longitudinal direction X.

In the embodiment depicted in FIG. 9, the internal wall 13 is thus provided with a single chicane 626$_1$ extending over a length, in the longitudinal direction, at least equal to a maximum internal dimension of the body measured perpendicular to the longitudinal direction, or in other words to the internal diameter of the body in this example. It will be further noted that the chicane 626$_1$ has an irregular profile in the longitudinal direction of the body. Thus, its height is variable in the X direction. The shape of this profile may be tailored to suit: it may be similar to the overall profile of the 5 chicanes in FIG. 4 or form undulations as depicted in FIG. 9. Furthermore, the height of the chicane could also be variable in each transverse section of the chicane.

The chicane or chicanes are arranged between the first and second zones Z1, Z2. Typically, the second zone has a length (in the longitudinal direction X) 2 to 10 times greater than the length of the first zone. The chicane or chicanes, notably the first chicane, may be situated at a distance "1" from the axis of the openings 16, 17 of the maximum internal dimension of the internal cross section of the body (in this instance the diameter) or even less than the maximum internal dimension of the internal cross section of the body, at the level of the first zone, for example at a distance corresponding to ¾ of this maximum internal dimension (for the sake of clarity, the figures are not drawn to scale).

The chicanes described hereinabove may be produced as one piece with the body 12, for example by moulding or machining, or may be added-on elements which are fixed, for example welded, held between flanges, or the like. When several chicanes are present, they may be identical or different, it being possible to combine the various shapes and arrangements of chicanes described hereinabove.

The invention claimed is:

1. An injection device configured to atomize a liquid into droplets using a gas, comprising a hollow tubular body extending in a longitudinal direction (X) and of which an internal wall defines a first zone referred to as a first contact zone (Z1) and a second zone (Z2) situated downstream of the first zone with respect to a direction in which the liquid and the gas circulate inside the body, the latter having:

at least two inlet openings opening into the first contact zone (Z1), to inject a liquid into the first zone, the said openings each having an axis oriented in such a way that the streams of liquid emanating from the said openings converge on a longitudinal line (X) extending inside the body, an inlet opening into the first contact zone (Z1), so as to inject an atomizing gas into the first contact zone, at least one outlet orifice situated downstream of the first and second zones, for removing the atomized liquid from the body, characterized in that the body has an internal cross section that varies continuously or is constant along its entire length and the internal wall of the body is provided, between the first and the second zones, with one or more chicanes configured so that, in each plane perpendicular to the longitudinal direction of the body containing the one or more chicanes, the one or more chicanes reduce an internal cross section of the body over the entire periphery of the internal wall, wherein the internal wall is provided with a plurality of disjointed chicanes, wherein more than one adjacent chicanes have heights, measured perpendicular to the longitudinal direction of the body, which are non-zero and different, and wherein in the longitudinal direction of the body, the heights of the adjacent chicanes increase up to a maximum and to decrease.

2. The injection device according to claim 1, wherein the internal wall is provided with a single chicane extending over a length, in the longitudinal direction, at least equal to a maximum internal dimension of the body measured perpendicular to the longitudinal direction.

3. The injection device according to claim 2, wherein the single chicane has an irregular profile in the longitudinal direction of the body.

4. The injection device according to claim 1, wherein at least one chicane is spaced away from at least one other chicane in the longitudinal direction of the body.

5. The injection device according to claim 1, wherein the one or more chicanes define a wall projecting from the internal wall and one edge of which is secured to the internal wall.

6. The injection device according to claim 5, wherein the wall defined by the one or more chicanes exhibits a free edge distant from the internal wall.

7. The injection device according to claim 5, wherein the internal wall is toothed or crenelated.

8. The injection device according to claim 5, wherein the one or more chicanes have orifices passing right through it.

9. The injection device according to claim 1, wherein the one or more chicanes have a height, measured perpendicular to the longitudinal direction of the body, that is non-zero and equal to at most ½ of a maximum internal dimension of the body perpendicular to the longitudinal direction of the body.

10. The injection device according to claim 1, wherein the one or more chicanes have, on the side of the inlet openings, a curved face arranged so as to direct a fluid impinging on the face towards the inside of the body.

* * * * *